(12) United States Patent
Eiselt et al.

(10) Patent No.: US 7,711,271 B2
(45) Date of Patent: May 4, 2010

(54) WAVE DIVISION MULTIPLEXED OPTICAL TRANSPORT SYSTEM UTILIZING OPTICAL CIRCULATORS TO ISOLATE AN OPTICAL SERVICE CHANNEL

(76) Inventors: Michael H. Eiselt, 250 Martin Pl., Middletown, NJ (US) 07748; Lara Garrett, 23 Irving Pl., Red Bank, NJ (US) 07701; Duncan L. MacFarlane, 6615 Desco Dr., Dallas, TX (US) 75225; Jeffrey Lloyd Cox, 280 Paddock Trail, Fairview, TX (US) 75069

( * ) Notice: Subject to any disclaimer, the term of this patent is extended or adjusted under 35 U.S.C. 154(b) by 901 days.

(21) Appl. No.: 10/427,209

(22) Filed: Apr. 30, 2003

(65) Prior Publication Data

US 2004/0033080 A1 Feb. 19, 2004

Related U.S. Application Data

(60) Provisional application No. 60/377,159, filed on Apr. 30, 2002, provisional application No. 60/376,978, filed on Apr. 30, 2002.

(51) Int. Cl.
*H04B 10/24* (2006.01)
*H04B 17/00* (2006.01)

(52) U.S. Cl. ............................ 398/181; 398/30; 398/42
(58) Field of Classification Search .................. 398/30, 398/31, 32, 33, 34, 41, 42, 177, 181
See application file for complete search history.

(56) References Cited

U.S. PATENT DOCUMENTS

| | | | |
|---|---|---|---|
| 4,229,831 A | 10/1980 | Lacher | |
| 4,535,459 A | 8/1985 | Hogge, Jr. | |
| 4,636,859 A | 1/1987 | Vernhet et al. | |
| 4,710,022 A | 12/1987 | Soeda et al. | |
| 5,224,183 A | 6/1993 | Dugan | |
| 5,225,922 A | 7/1993 | Chraplyvy et al. | |
| 5,267,071 A | 11/1993 | Little et al. | |
| 5,299,048 A | 3/1994 | Suyama | |
| 5,321,541 A | 6/1994 | Cohen | |
| 5,455,703 A | 10/1995 | Duncan et al. | |
| 5,559,625 A | 9/1996 | Smith et al. | |

(Continued)

FOREIGN PATENT DOCUMENTS

JP 01115230 5/1989

(Continued)

*Primary Examiner*—Nathan M Curs
(74) *Attorney, Agent, or Firm*—Woodcock Washburn LLP

(57) ABSTRACT

The invention provides for optical circulators which redirect light from port to port sequentially in one direction used to separate traffic in a bidirectional optical fiber transmission system. The invention provides for using two optical circulators in each span of bidirectional fiber so that the OSC channel can be transmitted in one direction opposite to the WDM channels. The invention also provides for a gigabit Ethernet path between chassis which is utilized for control traffic and customer traffic. The invention is placed in a non-critical region of the optical spectrum and is independent of all other chassis equipment. The invention also provides the advantage in alternate embodiments of providing the option of a second counter propagating WDM channel being transmitted along with the OSC to provide additional system capacity. The invention also provides the advantage in an alternate embodiment of allowing the OSC to be amplified through a raman source without the need of complete system retrofit.

39 Claims, 3 Drawing Sheets

U.S. PATENT DOCUMENTS

| | | | |
|---|---|---|---|
| 5,613,210 A | 3/1997 | Van Driel et al. | |
| 5,712,932 A * | 1/1998 | Alexander et al. | 385/24 |
| 5,726,784 A | 3/1998 | Alexander et al. | |
| 5,737,118 A | 4/1998 | Sugaya et al. | |
| 5,778,116 A | 7/1998 | Tomich | |
| 5,790,285 A | 8/1998 | Mock | |
| 5,812,290 A | 9/1998 | Maeno et al. | |
| 5,877,881 A | 3/1999 | Miyauchi et al. | |
| 5,903,613 A | 5/1999 | Ishida | |
| 5,914,794 A | 6/1999 | Fee | |
| 5,914,799 A | 6/1999 | Tan | |
| 5,936,753 A | 8/1999 | Ishikaawa | |
| 5,940,209 A | 8/1999 | Nguyen | |
| 5,963,350 A | 10/1999 | Hill | |
| 5,995,694 A | 11/1999 | Akasaka et al. | |
| 6,005,702 A | 12/1999 | Suzuki et al. | |
| 6,021,245 A | 2/2000 | Berger et al. | |
| 6,038,062 A | 3/2000 | Kosaka | |
| 6,075,634 A | 6/2000 | Casper et al. | |
| 6,078,414 A | 6/2000 | Iwano | |
| 6,081,360 A | 6/2000 | Ishikawa et al. | |
| 6,084,694 A | 7/2000 | Milton et al. | |
| 6,088,152 A | 7/2000 | Berger et al. | |
| 6,108,074 A | 8/2000 | Bloom | |
| 6,122,095 A | 9/2000 | Fatehi | |
| 6,151,334 A | 11/2000 | Kim et al. | |
| 6,157,477 A | 12/2000 | Robinson | |
| 6,160,614 A | 12/2000 | Unno | |
| 6,163,392 A | 12/2000 | Condict et al. | |
| 6,163,636 A | 12/2000 | Stentz et al. | |
| 6,173,094 B1 | 1/2001 | Bowerman et al. | |
| 6,177,985 B1 | 1/2001 | Bloom | |
| 6,198,559 B1 | 3/2001 | Gehlot | |
| 6,229,599 B1 | 5/2001 | Galtarossa | |
| 6,236,481 B1 | 5/2001 | Laor | |
| 6,236,499 B1 * | 5/2001 | Berg et al. | 359/341.2 |
| 6,246,510 B1 | 6/2001 | BuAbbud et al. | |
| 6,259,553 B1 | 7/2001 | Kinoshita | |
| 6,259,554 B1 | 7/2001 | Shigematsu et al. | |
| 6,259,693 B1 | 7/2001 | Ganmukhi et al. | |
| 6,259,845 B1 | 7/2001 | Sardesai | |
| 6,272,185 B1 | 8/2001 | Brown | |
| 6,275,315 B1 | 8/2001 | Park et al. | |
| 6,278,536 B1 * | 8/2001 | Kai et al. | 398/79 |
| 6,288,811 B1 | 9/2001 | Jiang et al. | |
| 6,288,813 B1 | 9/2001 | Kirkpatrick et al. | |
| 6,292,289 B1 * | 9/2001 | Sugaya et al. | 359/337 |
| 6,307,656 B2 | 10/2001 | Terahara | |
| 6,317,231 B1 | 11/2001 | Al-Salameh et al. | |
| 6,317,255 B1 | 11/2001 | Fatehi et al. | |
| 6,323,950 B1 | 11/2001 | Kim et al. | |
| 6,327,060 B1 * | 12/2001 | Otani et al. | 398/83 |
| 6,356,384 B1 | 3/2002 | Islam | |
| 6,359,729 B1 | 3/2002 | Amoruso | |
| 6,388,801 B1 | 5/2002 | Sugaya et al. | |
| 6,396,853 B1 | 5/2002 | Humphrey et al. | |
| 6,414,769 B1 * | 7/2002 | Meli et al. | 398/79 |
| 6,433,903 B1 * | 8/2002 | Barry et al. | 398/79 |
| 6,519,082 B2 | 2/2003 | Ghera et al. | |
| 6,532,320 B1 * | 3/2003 | Kikuchi et al. | 385/24 |
| 6,775,055 B2 * | 8/2004 | Tsuzaki et al. | 359/334 |
| 6,930,823 B2 * | 8/2005 | Nakamoto et al. | 359/334 |
| 2001/0005271 A1 | 6/2001 | Leclerc et al. | |
| 2001/0007605 A1 | 7/2001 | Inagaki et al. | |
| 2001/0009468 A1 | 7/2001 | Fee | |
| 2001/0014104 A1 | 8/2001 | Bottorff et al. | |
| 2001/0021044 A1 * | 9/2001 | Lim | 359/110 |
| 2002/0012152 A1 | 1/2002 | Agazzi et al. | |
| 2002/0015220 A1 | 2/2002 | Papernyl et al. | |
| 2002/0034197 A1 | 3/2002 | Tornetta et al. | |
| 2002/0044317 A1 | 4/2002 | Gentner et al. | |
| 2002/0044324 A1 | 4/2002 | Hoshida et al. | |
| 2002/0048287 A1 | 4/2002 | Silvers | |
| 2002/0051468 A1 | 5/2002 | Ofek et al. | |
| 2002/0063948 A1 | 5/2002 | Islam et al. | |
| 2002/0064181 A1 | 5/2002 | Ofek et al. | |
| 2002/0075903 A1 | 6/2002 | Hind | |
| 2002/0080809 A1 | 6/2002 | Nicholson et al. | |
| 2003/0151802 A1 * | 8/2003 | Berg et al. | 359/341.3 |

FOREIGN PATENT DOCUMENTS

| | | |
|---|---|---|
| JP | 02238736 | 9/1990 |

* cited by examiner

WAVE DIVISION MULTIPLEXED OPTICAL TRANSPORT SYSTEM UTILIZING OPTICAL CIRCULATORS TO ISOLATE AN OPTICAL SERVICE CHANNEL

CROSS-REFERENCE TO RELATED APPLICATIONS

This application claims priority to Provisional Application Ser. No. 60/377,159, entitled "Wave Division Multiplexed Optical Transport System Utilizing Optical Circulators to Isolate an Optical Service Channel", by Eiselt, et al., filed Apr. 30, 2002, and Provisional Application Ser. No. 60/376,978, entitled "Method and Architecture for Utilizing Gigabit Ethernet as an Optical Supervisory Channel", by Jeffrey Lloyd Cox, filed Apr. 30, 2002.

FIELD OF THE INVENTION

This invention relates to an optical transmission system including an additional optical service channel for system management.

BACKGROUND OF THE INVENTION

Optical transmission systems often use an optical service channel to communicate status and control information between various transceivers, amplifiers and transponders in an optical transmission system. It is important to minimize the insertion loss of the wavelength multiplexing filter used to couple the optical channels used to transmit payload data such as wave division multiplex (WDM) channels and the optical service channel (OSC).

Several prior art approaches exist, but none have the features of the current invention. For instance, U.S. Pat. No. 6,327,060 to Otani discloses an optical transmission system having an add drop station controlled by four optical circulators which allows signals to be added and dropped via fiber gratings which reflect selective wavelengths. The invention accomplishes a bypass of an optical supervisory channel but does not provide for the insertion and removal of an optical supervisory channel by optical circulators. Otani also suffers from adding additional unnecessary optical components which increase optical losses.

Another example is U.S. Pat. No. 6,122,095 to Fitehi. This patent discloses an optical add/drop multiplexor using one or more fiber gratings which are disposed along the length of rare earth doped fiber or between segments for reflecting optical signals which are added or dropped through circulators. However, Fitehi does not provide for a separate counter propagating optical service channel.

Another example is U.S. Pat. No. 5,299,048 to Suyama. This patent provides an optical communication system which employed a dichromic separator to distinguish between a signal light and a pumping light where the pumping light carries control information. However, Suyama suffers from the addition of losses in the dichromic separator and other losses associated with the addition of other optical components.

Therefore, a need exists for an optical transmission system which has an additional optical service channel for system management which has minimal impact on the WDM channels in the area of insertion loss.

SUMMARY OF THE INVENTION

The invention provides for optical circulators which redirect light from port to port sequentially in one direction used to separate traffic in a bidirectional optical fiber transmission system. The invention provides for using two optical circulators in each span of bidirectional fiber so that the OSC channel can be transmitted in one direction opposite to the WDM channels. The optical circulator is a low loss device which additionally has the attribute of uniform loss or very large optical bandwidth. Therefore, the invention provides the advantage of using a wide band circulator which does not impose a pass band shape on the WDM channel and therefore does not display accumulation of filter loss over long system spans. Additionally, the invention provides the advantage of a large tolerance on the optical service channel which allows uncooled distributed feedback or distributed bragg reflectors (DFB) lasers to be used which reduces system costs.

The invention also provides for a gigabit ethernet path between chassis which is utilized for control traffic and customer traffic. The invention is placed in a non-critical region of the optical spectrum and is independent of all other chassis equipment.

The invention also provides the advantage in alternate embodiments of providing the option of a second counter propagating WDM channel being transmitted along with the OSC to provide additional system capacity. The invention also provides the advantage in an alternate embodiment of allowing the OSC to be amplified through a raman source without the need of complete system retrofit.

DETAILED DESCRIPTION OF THE INVENTION

Figure 1:
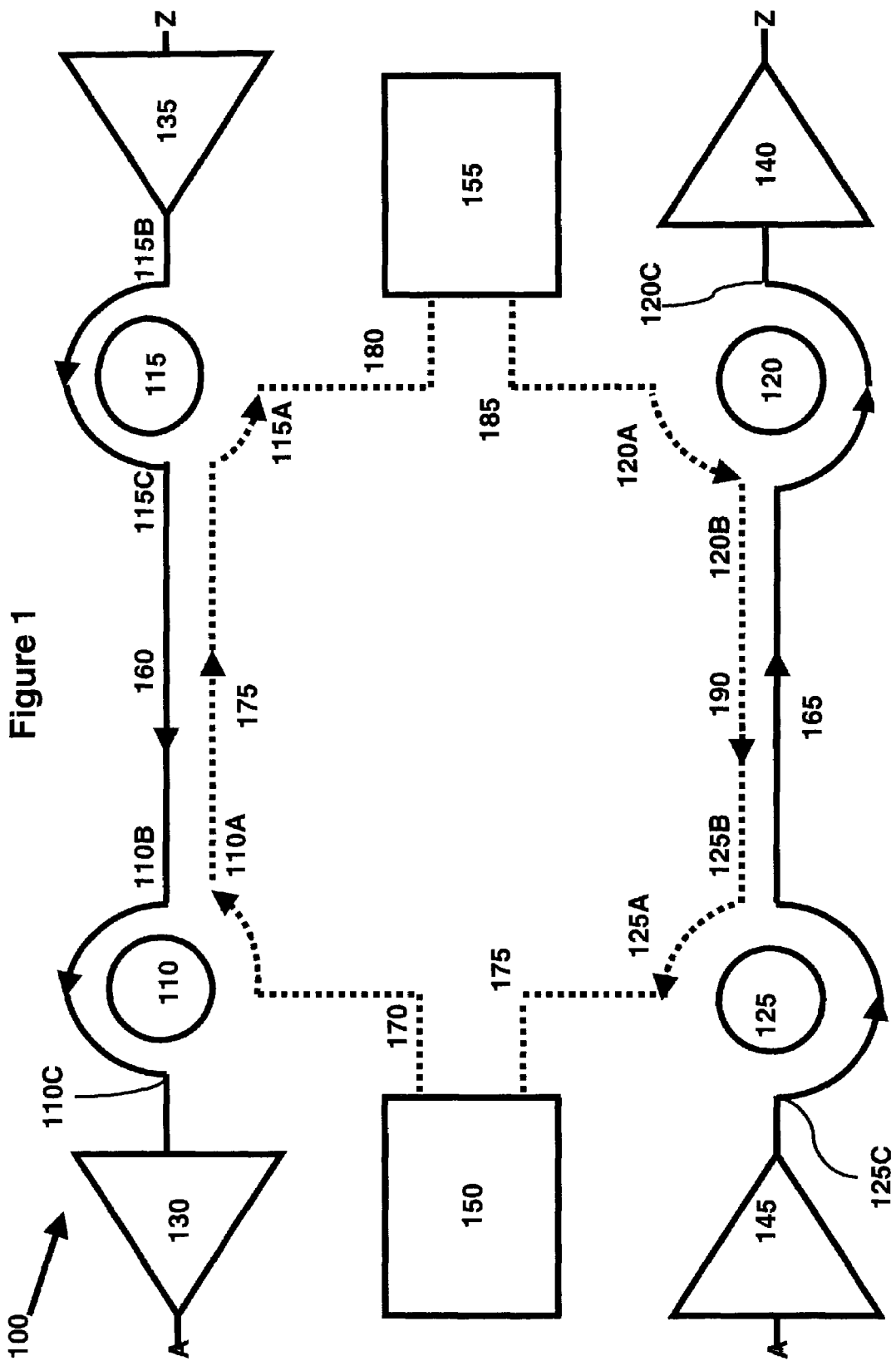
FIG. 1 shows a WDM transmission system with the counter propagating OSC channels provided in the current invention.

Referring to FIG. 1, WDM transmission system with a counter propagating OSC channel can be seen at 100. Generally FIG. 1 depicts a bidirectional fiber pair transmitting signals in the A-Z direction and Z-A direction between at least two transmission stations (not shown). In the A-Z direction the preferred embodiment of the invention provides for an optical amplifier 145, a management card 150, a removal circulator 125, a transmission fiber 165, an insertion circulator 120, an optical amplifier 140 and a management card 155. In the Z-A direction, the preferred embodiment of the invention provides for an optical amplifier 135, a management card 155, a removal circulator 115, a transmission fiber 160, an insertion circulator 110, an optical amplifier 130 and a management card 150.

In operation, in the A-Z direction, an optical signal in the L band range of 1570-1610 nm is sent to optical amplifier 145 and immediately transmitted to port 125c of circulator 125. The signal passes to port 125b of circulator 125 for transmission along optical fiber 165 to port 120b of optical circulator 120. The signal is passed to port 120c and on to optical amplifier 140. Management card 155 provides a counter propagating optical service channel at 1510 nm, 1540 nm or 1625 nm along optical fiber 185 to port 120a of optical circulator 120. In the preferred embodiment, management card 155 produces the OSC with an uncooled DFB laser which may be used despite its wavelength variation of 12 nm over a 70º temperature change because of the configuration of circulators 120 and 125. OSC is passed to port 120b of optical circulator 120 and then is counter propagated in the direction 190 to port 125b of optical circulator 125. The OSC is then passed to port 125a of optical circulator 125 along optical fiber 175 to management card 150 to be decoded and used to operate or check the status of the optical transmission system. In the preferred embodiment, management cards 150 and 155 include full duplex optical transceivers.

In the Z-A direction an L band signal is provided to optical amplifier 135 which is passed to port 115b of circulator 115, then on to exit at port 115c through optical fiber 160 to port 110b of the optical circulator 110. The signal then exits optical circulator 110 at port 110c to be amplified by amplifier 130 before moving on to the next amplifier or receiver in the optical transmission system. Management card 150 creates an OSC which is transmitted along fiber 170 to port 110a of circulator 110 at 1510 nm, 1540 nm or 1625 nm. Of course other frequencies are possible. The signal exits circulator 110 at port 110b and onto optical fiber 160 in the direction 165 where it enters optical circulator 115 at port 115c and exits at port 115a. After exiting 115a the counter propagating OSC travels through fiber 180 to management card 155 where the control information passed is used to control or check the status of the optical transmission system.

In the preferred embodiment, the format of the OSC is a separate wavelength which is independent of and transparent to the other wavelengths being transmitted on the system. The OSC in the preferred embodiment is a full duplex gigabit Ethernet signal which also can be utilized for customer traffic. The OSC provides for generic customer LAN connectivity at all sites. It enables any customer access to the LAN that can run on an Ethernet network. The gigabit Ethernet OSC also provides high bandwidth for control traffic between terminal sites.

Figure 2:
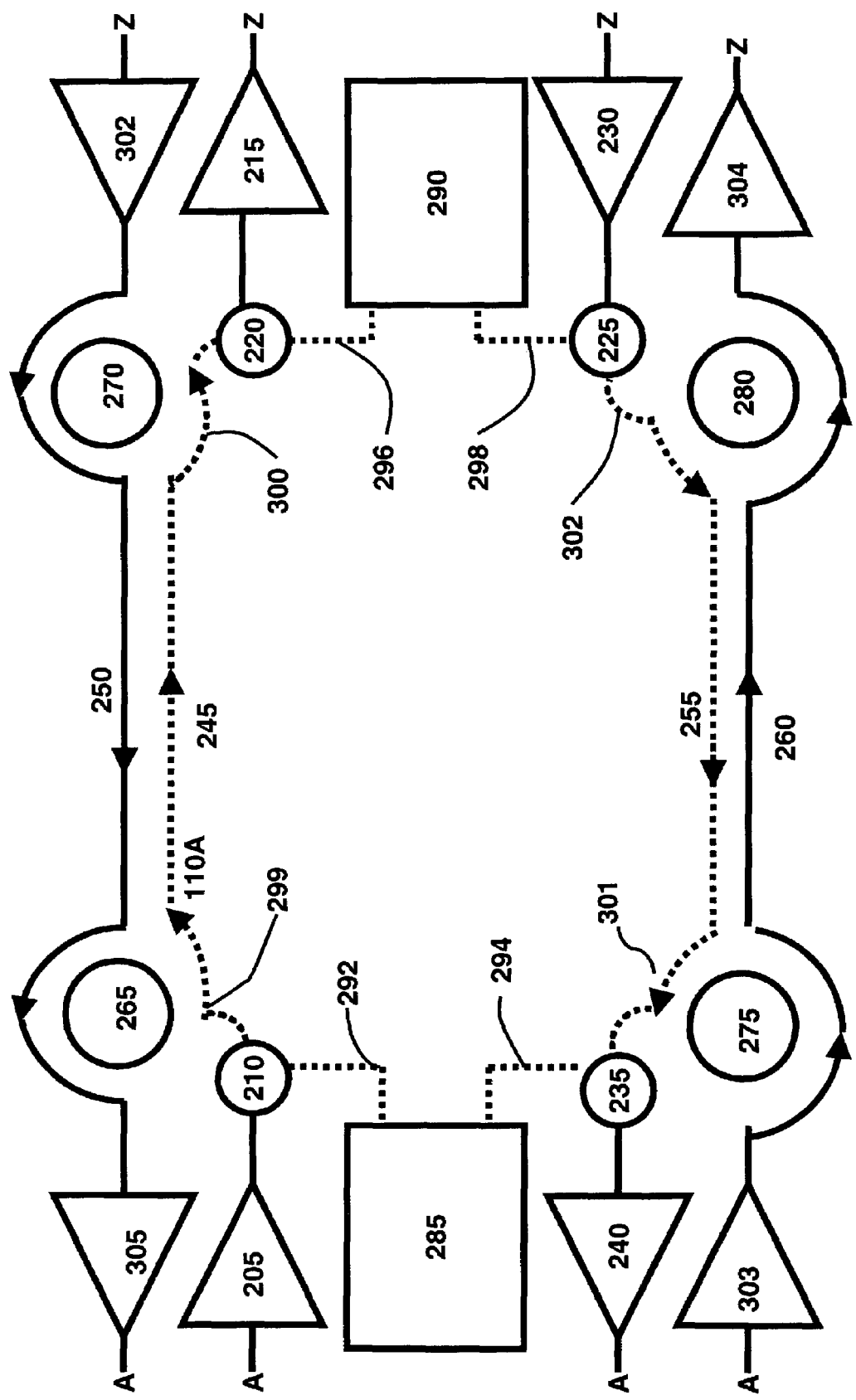
FIG. 2 is an upgraded WDM transmission system with two counter propagating bands of WDM channels.

An alternate embodiment of the preferred invention is shown at FIG. 2 at 200. FIG. 2 at 200 shows an upgraded WDM transmission system which adds an additional WDM transmission band in the propagation direction of the OSC channel without adding any optical filters to the transmission path of the original WDM transmission band. In this embodiment, an additional optical amplifier 205 transmits a second WDM band to wavelength multiplexor 210 where it is combined with OSC generated by management card 285 and transmitted to wavelength multiplexor 210 by fiber 292. The combined second WDM band and the OSC are transmitted along fiber 299 to circulator 265 where they exit along fiber 215 in the A-Z direction 245. The combined signal enters circulator 270 and exits along fiber 300 to wavelength demultiplexor 220. Wavelength demultiplexor 220 can be a wavelength demultiplexor filter. The second WDM band is passed to optical amplifier 215. The OSC is passed along fiber 296 to management card 290. In the Z-A direction, management card 290 generates an OSC signal which passes along fiber 298 to be combined with a second WDM band transmitted through optical amplifier 230 to be combined in wavelength multiplexor 225. The combined signal is transmitted along fiber 302 to circulator 280 where it travels along fiber 260 in direction 255 to circulator 275. Upon exiting circulator 275 along fiber 301 the combined signal is demultiplexed at wavelength demultiplexor 235 into the OSC channel passed along fiber 294 to management card 285 and the second WDM channel which is passed to amplifier 240.

One advantage of the transmission system shown in FIG. 2 is that it may be easily upgraded to add additional WDM transmission bands in the propagation in the direction of the OSC channels without adding optical filters to the transmission path of the original WDM transmission band. This can be accomplished without disturbing traffic on the original WDM transmission band because the circulators are already in place.

The second WDM transmission band and the OSC can be separated at the optical amplifiers with conventional wavelength multiplexing filters. The second WDM transmission band can be used to implement a shortened optical path which can contain ultra long haul channels and additional metro channels on the same fiber.

Optical amplifiers 302, 303, 304 and 305 operate similarly to that described with respect to FIG. 1. The circulators 265, 270, 275 and 280 also function similarly to those described in FIG. 1.

Figure 3:
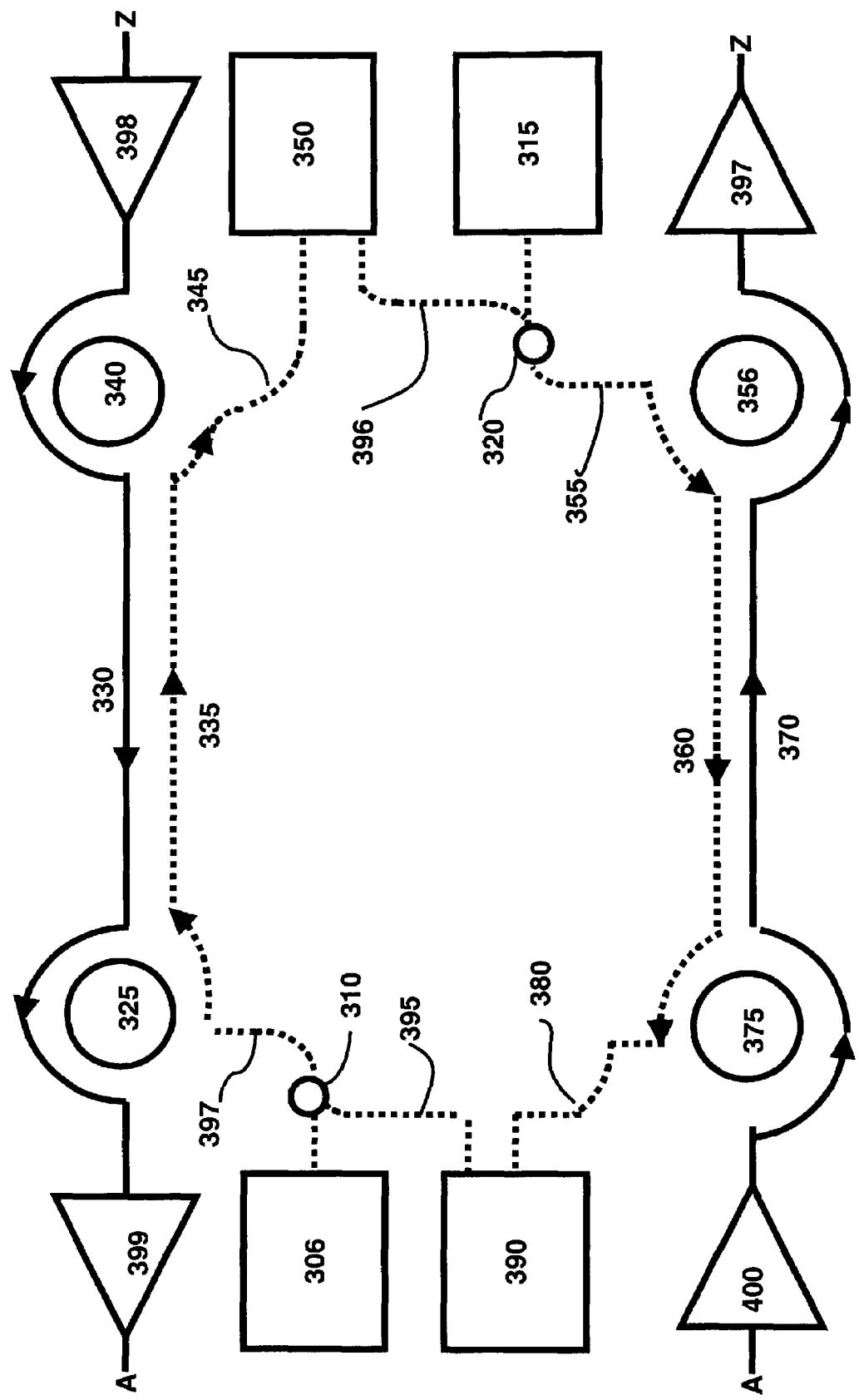
FIG. 3 is an upgraded WDM transmission with distributed raman amplification.

A further alternate embodiment is shown in FIG. 3 at 300. Generally, FIG. 3 adds raman amplification to the data signal to traverse additional distance. In FIG. 3, a raman source of amplification 306 is coupled at wavelength multiplexor 310 to the OSC signal generated 395 from management card 390. The combined signal travels along fiber 330 to circulator 325 where it is placed on fiber 330 in direction 335. The signal arrives at circulator 340 where it is removed from fiber 330 and transmitted along fiber 345 to management card 350. In the Z-A direction, management card 350 generates an OSC signal which is transmitted along fiber 396 to be combined with raman amplification generated by raman source 315 at wavelength multiplexor 320. The combined signal is transmitted along fiber 355 to circulator 356 where it is inserted onto and travels along fiber 370 in direction 360. Upon reaching circulator 375 the combined signal is removed and follows fiber 380 to management card 390.

Optical amplifiers 397, 398, 399 and 400 perform similar functions to those described with respect to FIG. 1. Similarly, optical circulators 325, 340, 375 and 356 perform similar functions to those described with respect to FIG. 1.

The advantage of this preferred embodiment is that the previously installed optical circulators can be used to add distributed raman amplification to the system without disturbing the WDM signal traffic. In this embodiment the circulators must have sufficient power ratings for a raman pump laser source in the 500 mW range. Additionally, wavelength multiplexors 310 and 320 are necessary to couple the OSC and the raman pump wavelengths.

The previous descriptions are of preferred examples for implementing the invention, and the scope of the invention should not necessarily be limited by this description. The scope of the present invention is defined by the following claims:

The invention claimed is:

1. A bidirectional optical transmission system comprising:
   an optical transmission path capable of transporting optical signals in a propagating direction and a counter-propagating direction;
   a wavelength multiplexer configured to combine an optical service channel signal and a Raman amplification signal;
   a first circulator coupled to the optical transmission path and the wavelength multiplexer, the first circulator configured to direct the combined optical service channel signal and Raman amplification signal into the optical transmission path in the counter-propagating direction, and further configured to direct the optical signal along the optical transmission path in the propagating direction; and
   a second circulator coupled to the optical transmission path, the second circulator configured to remove the combined optical service channel signal and Raman amplification signal from the optical transmission path, and further configured to direct the optical signal along the optical transmission path in the propagating direction.

2. The bidirectional optical transmission system of claim 1, wherein the optical signal is in a L band.

3. The bidirectional optical transmission system of claim 1, wherein the optical service channel signal is in a range of about 1510 nm, 1540 nm or 1625 nm.

4. The bidirectional optical transmission system of claim 1, further comprising an uncooled distributed feedback laser configured to generate the optical service channel signal.

5. The bidirectional optical transmission system of claim 1, wherein a wavelength range of the optical service channel signal can vary up to 12 nm.

6. The bidirectional optical transmission system of claim 1 further comprising a demultiplexer coupled to the second circulator, wherein the demultiplexer is configured to separate the Raman amplification signal and the optical service channel signal.

7. The bidirectional optical transmission system of claim 1 further comprising a Raman source configured to produce the Raman amplification signal.

8. The bidirectional optical transmission system of claim 1, wherein the optical signal is a gigabit Ethernet signal.

9. The bidirectional optical transmission system of claim 8, wherein the gigabit Ethernet signal is full duplex.

10. The bidirectional optical transmission system of claim 1, wherein the first circulator is further configured to direct a counter-propagating wave division multiplex signal into the optical transmission path.

11. An optical transmission system comprising:
a first bidirectional optical transmission path capable of transporting optical signals in a first propagating direction and a first counter-propagating direction;
a second bidirectional optical transmission path capable of transporting optical signals in a second propagating direction and a second counter-propagating direction;
a first wavelength multiplexer configured to combine a first optical service channel signal and a first Raman amplification signal into a first combined counter-propagating signal;
a first circulator connected to the first bidirectional optical transmission path and the first wavelength multiplexer, wherein the first circulator is configured to direct the first combined counter-propagating signal along the first bidirectional optical transmission path in the first counter-propagating direction, and further configured to direct a first optical signal along the first bidirectional optical transmission path in the first propagating direction;
a second circulator connected to the first bidirectional optical transmission path, wherein the second circulator is configured to remove the first combined counter-propagating signal from the first bidirectional optical transmission path, and further configured to direct the first optical signal along the first bidirectional optical transmission path in the first propagating direction;
a second wavelength multiplexer configured to combine a second optical service channel signal and a second Raman amplification signal into a second combined counter-propagating signal;
a third circulator connected to the second bidirectional optical transmission path and the second wavelength multiplexer, wherein the third circulator is configured to direct the second combined counter-propagating signal along the second bidirectional optical transmission path in the second counter-propagating direction, and further configured to direct a second optical signal along the second bidirectional optical transmission path in the second propagating direction; and
a fourth circulator connected to the second bidirectional optical transmission path, wherein the fourth circulator is configured to remove the second combined counter-propagating signal from the second bidirectional optical transmission path, and further configured to direct the second optical signal along the second bidirectional optical transmission path in the second propagating direction.

12. The optical transmission system of claim 11, wherein the first and second optical signals are in a L band.

13. The optical transmission system of claim 11, wherein the first and second optical service channel signals are each within a range of about 1510 nm, 1540 nm or 1625 nm.

14. The optical transmission system of claim 11, further comprising:
a first uncooled distributed feedback laser configured to generate the first optical service channel signal; and
a second uncooled distributed feedback laser configured to generate the second optical service channel signal.

15. The optical transmission system of claim 11, wherein the first and second optical signals each comprise a respective wave division multiplex signal.

16. The optical transmission system of claim 11 further comprising a demultiplexer coupled to the second circulator, wherein the demultiplexer is configured to separate the first Raman amplification signal and the first optical service channel signal.

17. The optical transmission system of claim 11 further comprising a Raman source configured to produce the first Raman amplification signal.

18. The optical transmission system of claim 11 further comprising a Raman source configured to produce the second Raman amplification signal.

19. The optical transmission system of claim 11 wherein the first optical signal is a gigabit Ethernet signal.

20. The optical transmission system of claim 19 wherein the gigabit Ethernet signal is full duplex.

21. The optical transmission system of claim 11 further comprising:
a first amplifier and a second amplifier, each connected to the first bidirectional optical transmission path, wherein the first bidirectional optical transmission path is configured to carry the first optical signal between the first and second amplifiers; and
a third amplifier and a fourth amplifier, each connected to the second bidirectional optical transmission path, wherein the second bidirectional optical transmission path is configured to carry the second optical signal between the third and fourth amplifiers.

22. The optical transmission system of claim 11 further comprising:
a first amplifier connected to the first bidirectional optical transmission path and the second circulator;
a second amplifier connected to the first bidirectional optical transmission path and the first circulator, wherein the second amplifier is configured to receive the first optical signal from the first amplifier;
a third amplifier connected to the second bidirectional optical transmission path and the fourth circulator; and
a fourth amplifier connected to the second bidirectional optical transmission path and the third circulator, wherein the fourth amplifier is configured to receive the second optical signal from the third amplifier.

23. The optical transmission system of claim 11, wherein the first circulator is further configured to direct a first counter-propagating wave division multiplex signal into the first bidirectional optical transmission path.

24. The system of claim 11, further comprising:
   a first management card configured to generate the first optical service channel signal and further configured to receive the second combined counter-propagating signal; and
   a second management card configured to generate the second optical service channel signal and further configured to receive the first combined counter-propagating signal.

25. A method of combining optical signals on a bidirectional optical transmission path, the method comprising:
   receiving an optical signal on the optical transmission path;
   multiplexing an optical service channel signal and a Raman amplification signal to form a combined counter-propagating signal;
   directing the combined counter-propagating optical signal into the optical transmission path via a first circulator;
   removing the combined counter-propagating optical signal from the optical transmission path via a second circulator; and
   directing the optical signal along the optical transmission path in a propagating direction via the second circulator.

26. The method of claim 25, wherein the optical signal is in a L band.

27. The method of claim 25, wherein the optical service channel signal is a range of about 1510 nm, 1540 nm or 1625 nm.

28. The method of claim 25, further comprising:
   generating the optical service channel signal using an uncooled distributed feedback laser.

29. The method of claim 25, wherein a wavelength range of the optical service channel signal can vary up to 12 nm.

30. The method of claim 25 further comprising separating the Raman amplification signal and the optical service channel signal via a demultiplexer.

31. The method of claim 25 further comprising amplifying the optical signal via a Raman source.

32. The method of claim 25, wherein the optical signal is a gigabit Ethernet signal.

33. The method of claim 32, wherein the gigabit Ethernet signal is full duplex.

34. The method of claim 25 further comprising directing a counter-propagating wave division multiplex signal into the optical transmission path via the first circulator.

35. A system for combining optical signals on an optical transmission path comprising:
   means for transporting an optical signal in a first direction;
   means for multiplexing a counter-propagating optical service channel signal and a counter-propagating Raman amplification signal;
   means for directing the multiplexed optical service channel signal and a Raman amplification signals signal into the means for transporting in a second, opposite direction; and
   circulator means for directing all signals propagating in the first direction along the means for transporting to continue propagating in the first direction, and configured to direct all signals propagating in the second direction along the means for transporting out of the means for transporting;
   wherein the circulator means is configured to direct the multiplexed optical service channel signal and Raman amplification signal out of the means for transporting, and to direct the optical signal in the first direction.

36. The system of claim 35 further comprising means for generating the Raman amplification signal.

37. The system of claim 35 further comprising means for generating the optical service channel signal.

38. The system of claim 35 further comprising means for separating the optical service channel signal and the Raman amplification signal.

39. The system of claim 35, wherein the means for directing the optical service channel signal further includes means for inserting a wave division multiplex signal into the communications means in the second direction.

* * * * *

UNITED STATES PATENT AND TRADEMARK OFFICE
CERTIFICATE OF CORRECTION

PATENT NO.         : 7,711,271 B2
APPLICATION NO.    : 10/427209
DATED              : May 4, 2010
INVENTOR(S)        : Eiselt et al.

It is certified that error appears in the above-identified patent and that said Letters Patent is hereby corrected as shown below:

Column 2, line 65, delete "700 temperature" and insert -- 70° temperature --.

Column 3, lines 46-47, delete "fiber 215" and insert -- fiber 250 --.

Column 7, line 5, in Claim 24, delete "system" and insert -- optical transmission system --.

Column 8, line 15, in Claim 35, before "Raman" delete "a".

Column 8, line 15, in Claim 35, after "amplification" delete "signals".

Signed and Sealed this
Fourteenth Day of June, 2011

David J. Kappos
*Director of the United States Patent and Trademark Office*